B. VON BÜLTZINGSLÖWEN.
MACHINE FOR BENDING THE CROSS HEADS AND EYES OF WIRE BALE TIES.
APPLICATION FILED DEC. 19, 1911.
1,039,894.
Patented Oct. 1, 1912.
9 SHEETS—SHEET 2.
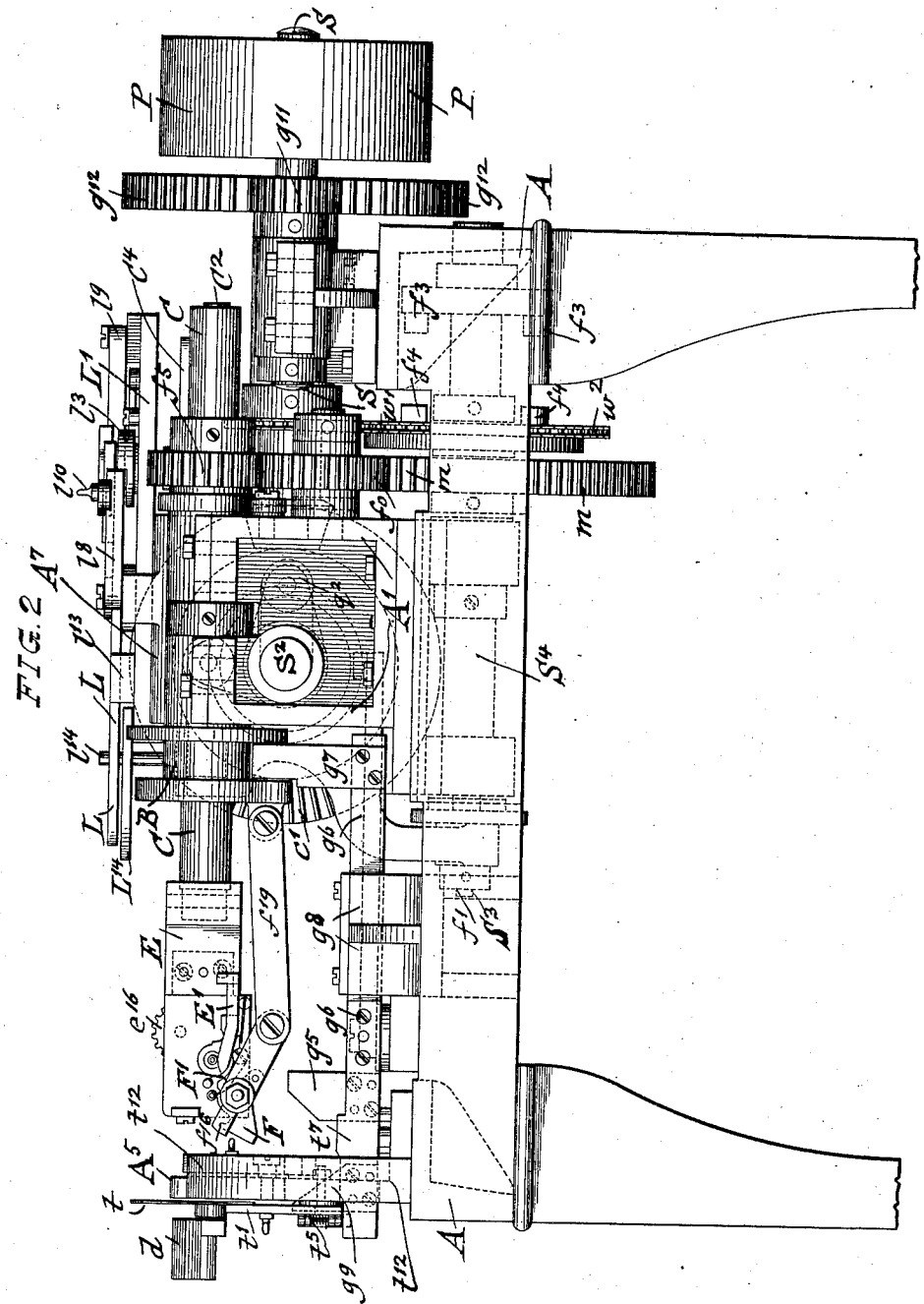
WITNESSES:
INVENTOR
BY
ATTORNEYS.

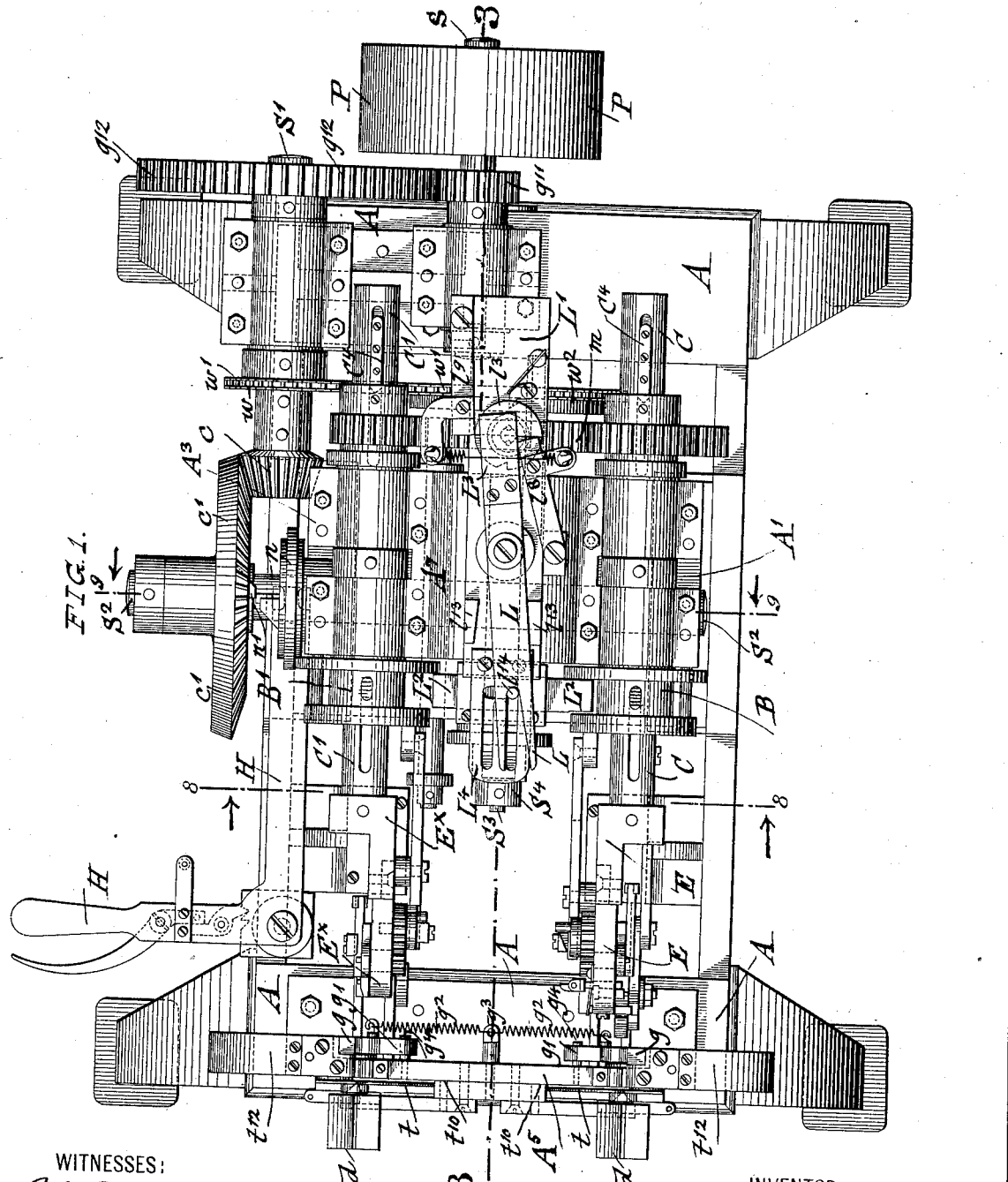

B. VON BÜLTZINGSLÖWEN.
MACHINE FOR BENDING THE CROSS HEADS AND EYES OF WIRE BALE TIES.
APPLICATION FILED DEC. 19, 1911.
1,039,894.
Patented Oct. 1, 1912.
9 SHEETS—SHEET 3.
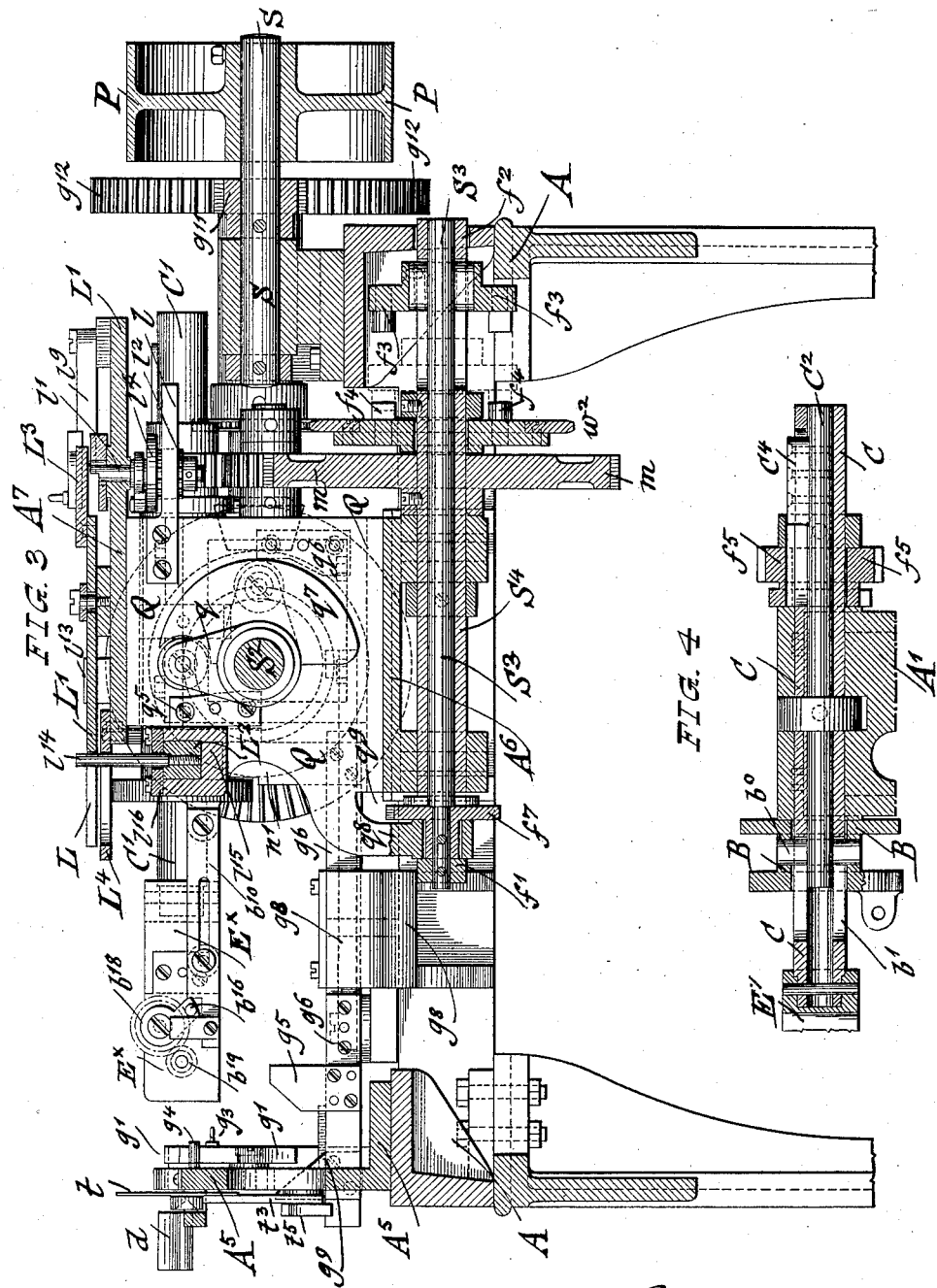
WITNESSES:
INVENTOR
Bruno von Bültzingslöwen
BY
ATTORNEYS.

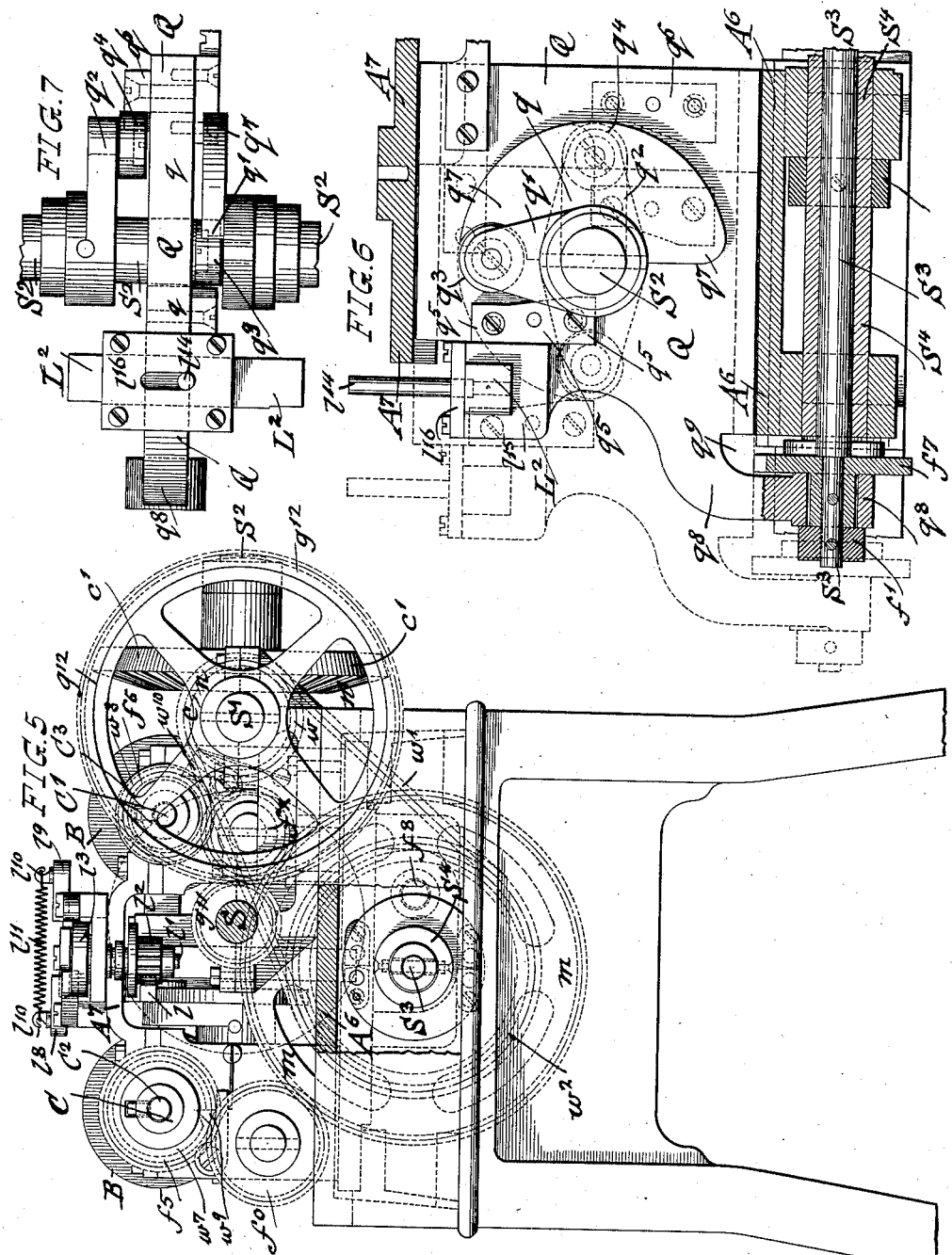

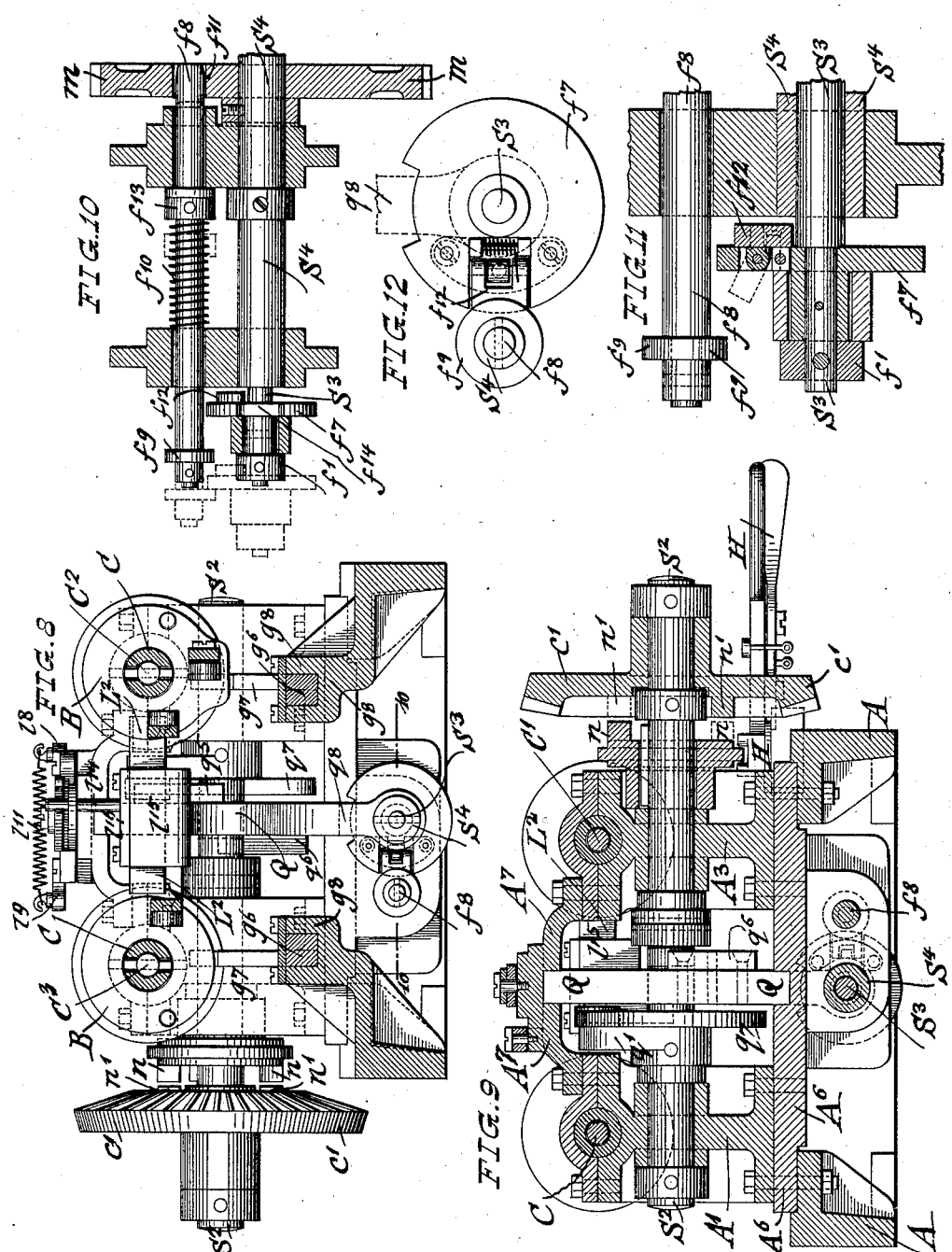

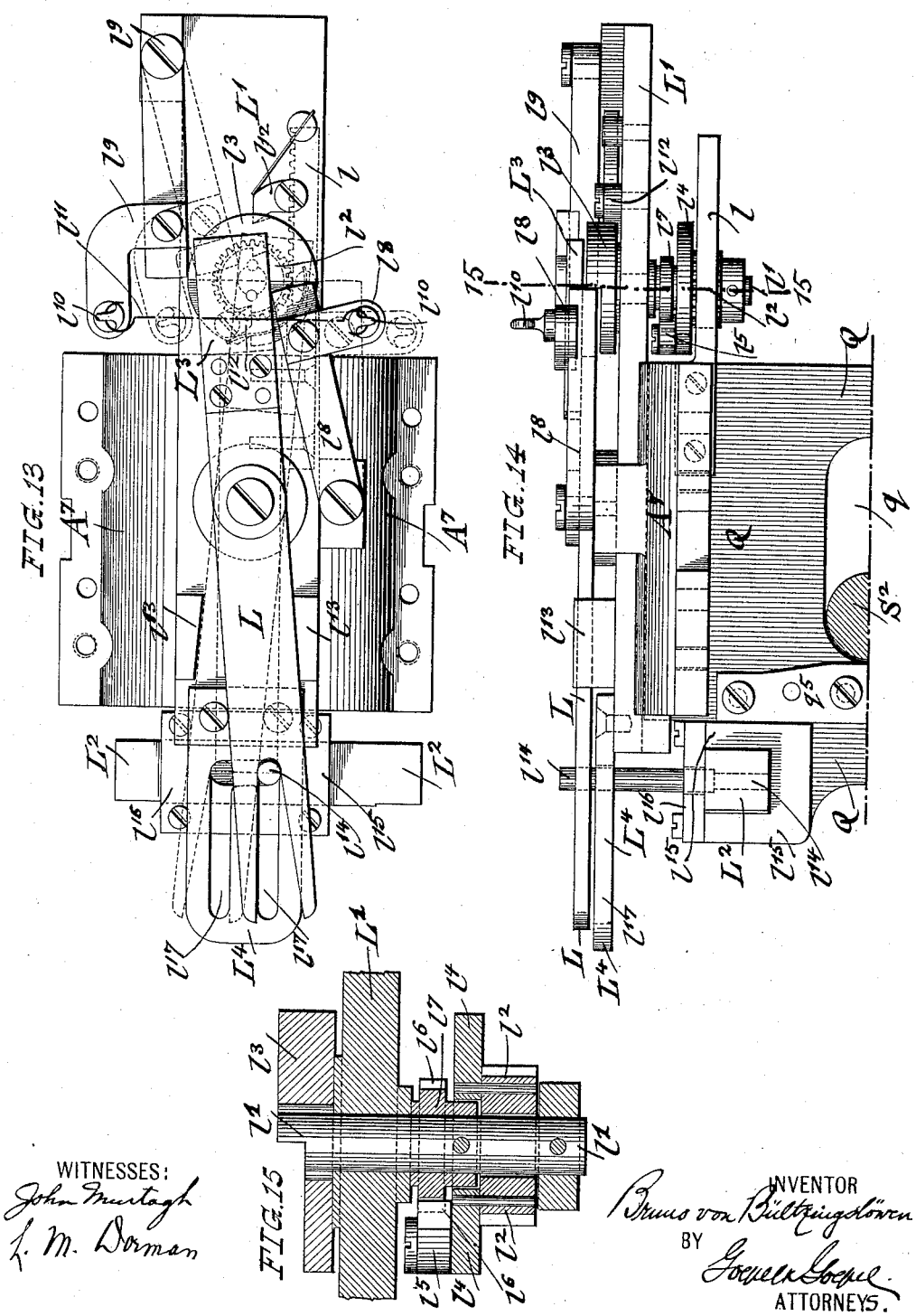

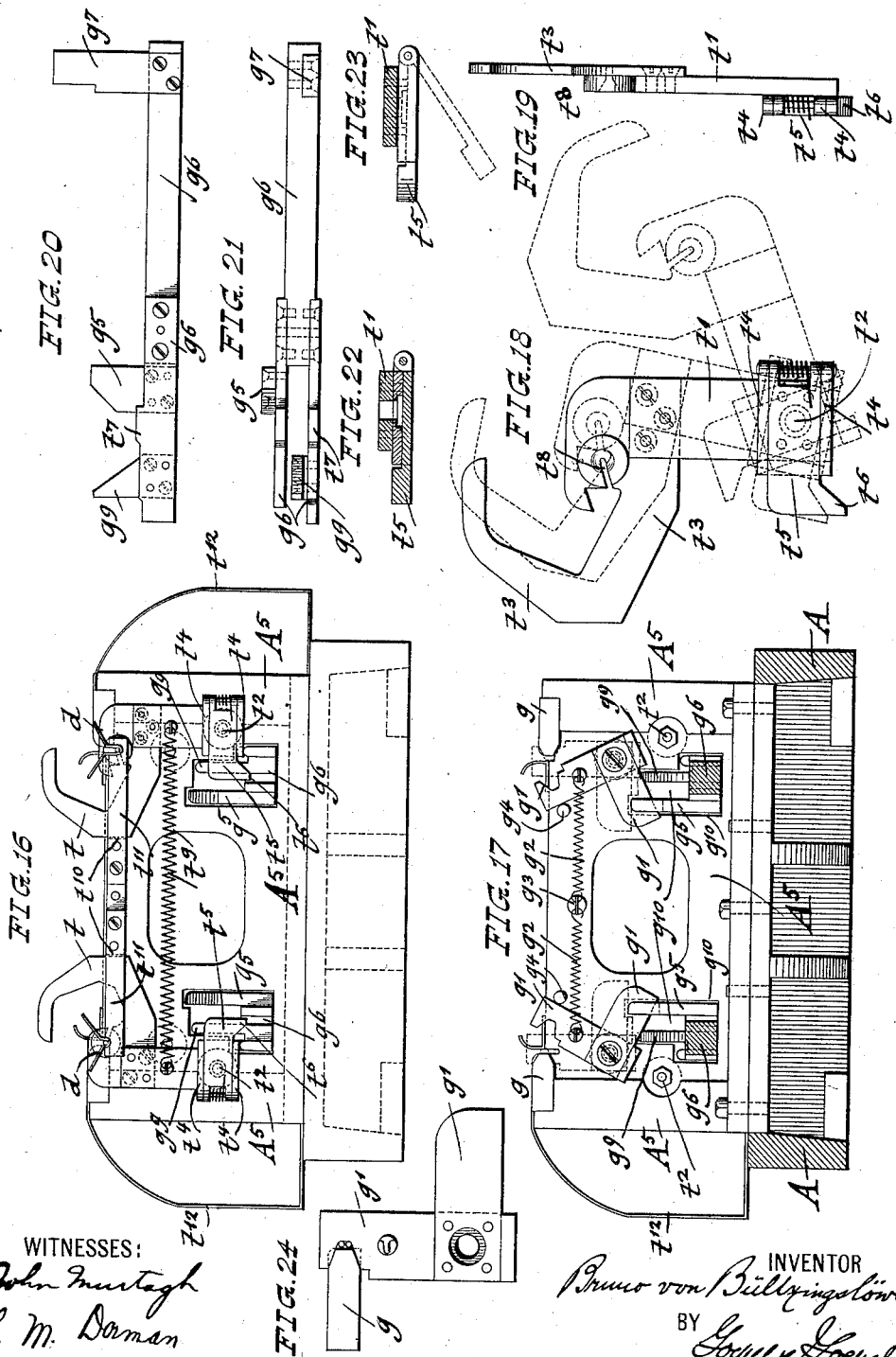

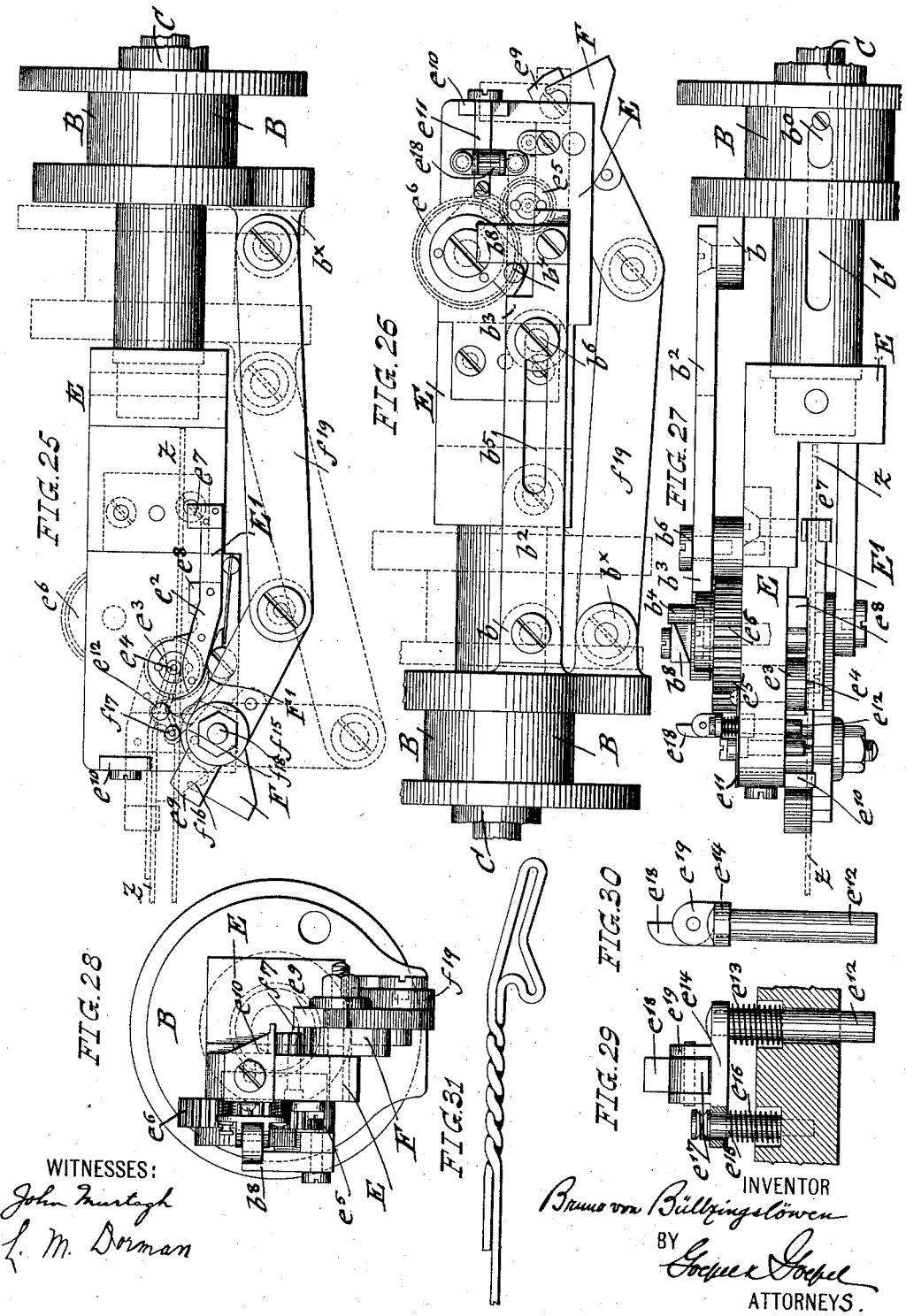

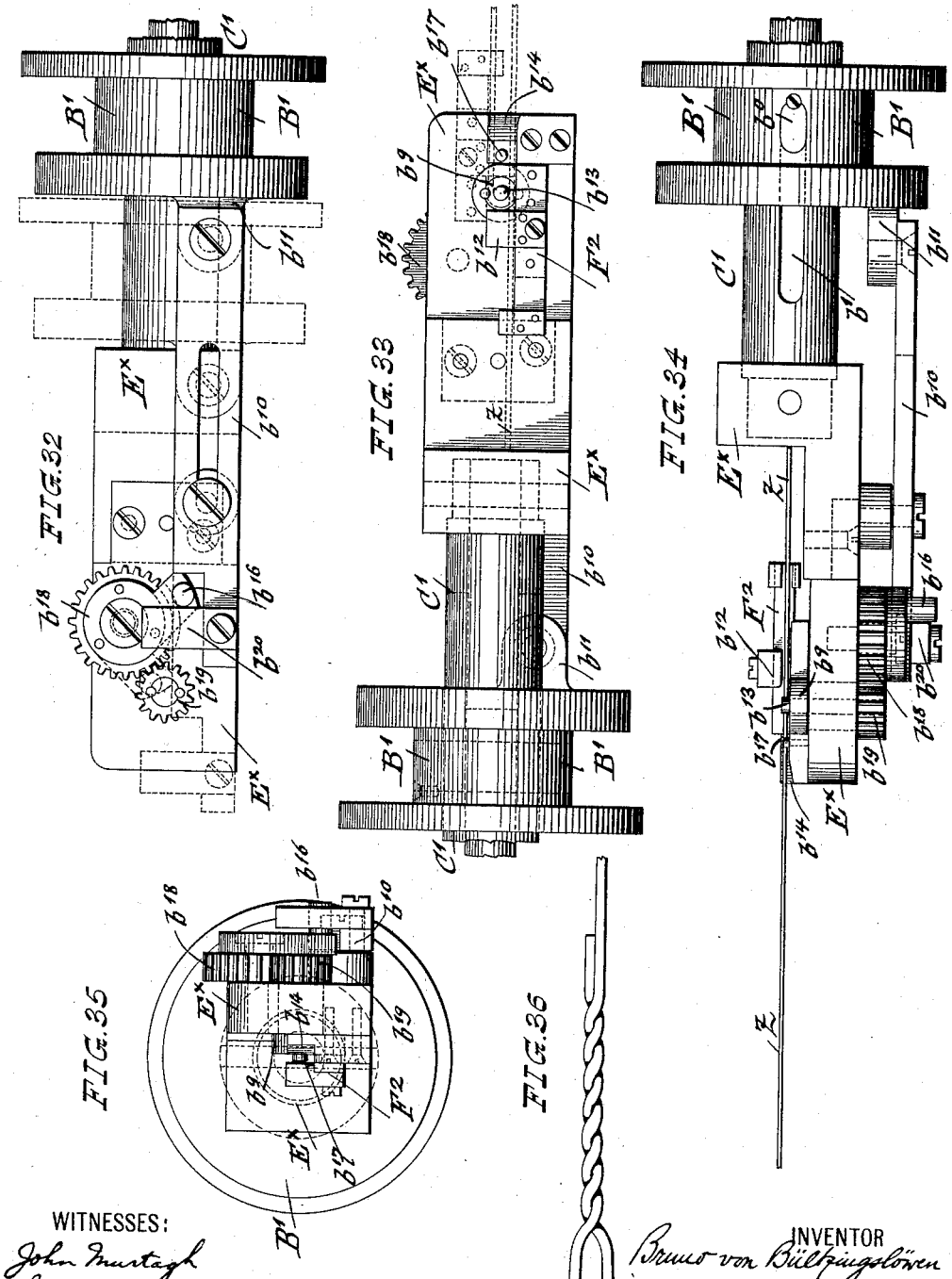

UNITED STATES PATENT OFFICE.

BRUNO von BÜLTZINGSLÖWEN, OF NEW YORK, N. Y., ASSIGNOR TO THE BRUNO WORKS, OF NEW YORK, N. Y., A CORPORATION OF NEW YORK.

MACHINE FOR BENDING THE CROSS-HEADS AND EYES OF WIRE BALE-TIES.

1,039,894. Specification of Letters Patent. Patented Oct. 1, 1912.

Application filed December 19, 1911. Serial No. 666,660.

*To all whom it may concern:*

Be it known that I, BRUNO VON BÜLTZINGSLÖWEN, a citizen of the United States of America, residing in New York, in the borough of the Bronx, county and State of New York, have invented certain new and useful Improvements in Machines for Bending the Cross-Heads and Eyes of Wire Bale-Ties, of which the following is a specification.

This invention relates to machines for bending the crossheads and eyes of wire bale-ties, and more especially to improvements in the machine for which Letters Patent were granted to me on May 17, 1904, No. 760,100, whereby the construction of the machine is considerably simplified, the number of parts required for the same greatly reduced, and the repairing of the same facilitated as compared with the prior machine made under the Letters Patent referred to. It was found by practical tests made by machines which were built under the patent referred to that the power-shifting mechanism described and claimed therein was too delicate and complicated and liable to breakage and repairs, which owing to the complexity of the construction could not be done by simply replacing the broken parts but by returning the machine to the factory. This discredited the machine and discouraged its use. Furthermore, the complicated power-shifting mechanism was liable to give out after a comparatively short use of the machine, especially when the machine was subjected to severe strain for making the guaranteed production of 25,000 bale-ties in a working day of ten hours. To overcome these objections and deficiencies referred to, the machine forming the subject-matter of this application was designed. It contains only about one-half of the number of parts contained in the former machine, produces the required guaranteed output without overstraining the machine, mainly by its greatly simplified power-shifting mechanism so that very few repairs are necessary and that when they are necessary, they can be made by simply exchanging the worn or broken parts by reserve-parts ordered from or supplied by the factory where the machines were made; and for this purpose the invention consists primarily and essentially of the improved construction of the automatically - operated power - shifting mechanism which is located between the operating shafts of the crosshead and eye-bending devices for producing the alternating operation of the same in connection with the alternating feeding of the wire-blanks to one or the other set of bending devices.

The invention consists secondarily, of improvements in the details of some of the operating parts, namely, such as the wire-clamping, shank - twisting and ejecting devices, as will be fully described hereinafter and finally pointed out in the claims.

In the accompanying drawings, to which reference is made and in which similar letters of reference indicate corresponding parts throughout the several figures, Figure 1 represents a plan-view of my improved machine for bending the crossheads and eyes of wire bale-ties, Fig. 2 is a side-elevation of Fig. 1, Fig. 3 is a vertical longitudinal section of the machine on line 3—3, Fig. 1, Fig. 4 is a detail vertical longitudinal section through one of the shafts of the crosshead or eye-bending devices, Fig. 5 is an end-elevation of the right-hand end of the machine, with parts broken off, and showing the motion-transmitting mechanism for the shank-twisting devices, Fig. 6 is a vertical central section, drawn on a larger scale, of the reciprocating slide-plate, controlling the power-shifting mechanism of the machine, Fig. 7 is a plan-view of Fig. 6, Fig. 8, a front-elevation of the power-shifting mechanism, on line 8—8, Fig. 1, taken in the direction of the arrows, Fig. 9, a vertical transverse section, taken on line 9—9, Fig. 1, in the direction of the arrows, Fig. 10 is a detail horizontal section showing the locking device for the motion-transmitting main gearwheel of the shank-twisting mechanism, taken on line 10—10, Fig. 8, Fig. 11 is a horizontal section of the left-hand end of Fig. 10, drawn on a still larger scale than Fig. 10, Fig. 12 is a detail elevation, taken from the left-hand side of Fig. 11, Fig. 13 is a plan-view of the power-shifting mechanism, shown as detached from the machine and drawn on a larger scale, Fig. 14 is a side-elevation of Fig. 13, Fig. 15 is a detail vertical section, taken on line 15—15, Fig. 14, Fig. 16 is an elevation of the ejecting devices, taken from the left-hand or front-end of the machine, Fig. 17 is a rear-elevation of Fig. 16, showing the wire-blank clamping devices, Figs. 18 and 19 are respectively a detail elevation and an end-view of one of the ejecting devices, Figs. 20 and 21 are respectively a side-elevation and a plan-view of the sliding cam-piece, used for actuating the wire-clamping and ejecting devices, Figs. 22 and 23 are sectional details of the latches operated by the sliding cam-piece of the ejecting device, shown respectively in closed and partly open position, Fig. 24 is a detail view of the wire-clamping device, drawn on a larger scale, Figs. 25, 26, 27 and 28 are respectively a side-elevation of one side, a side-elevation of the other side, a plan-view and an end-view of the crosshead bending devices, Figs. 29 and 30 are respectively a detail front-view and a top-view of the pusher of the crosshead bending devices, Fig. 31 is a side-view of the crosshead of a bale-tie, made by the machine and bent with three twists in its shank, Figs. 32, 33, 34 and 35 are respectively side-elevations from opposite sides, a plan-view and an end-view of the eye-bending devices, and Fig. 36 is a detail side-view of the eye of a wire bale-tie bent with four-twists in its shank, as made by the machine.

The improved machine, in its general construction, is built on the same lines as the prior machine, shown in Patent No. 760,100 before referred to. It consists mainly of a power-shifting mechanism, which is arranged between the crosshead and eye-bending devices and the shafts of the same, which shafts are arranged sidewise of and parallel with each other, while the shank-twisting and motion-transmitting mechanisms are shown at the right-hand end of the machine and the wire-clamping and ejecting devices are arranged at the left-hand end of the machine, in front of the die-heads, carrying the crosshead and eye-bending devices. In place of a treadle-mechanism for starting the machine, a hand-operated lever is arranged at one side of the machine for starting or stopping the machine.

As the power-shifting mechanism forms the essential feature of the present machine, and one to which the simplified construction of the machine is due, it will be first described, after which the crosshead and eye-bending, wire-clamping, shank-twisting, motion-transmitting and ejecting devices will be described in their successive order.

*The power-shifting mechanism.*—The power-shifting mechanism is shown in detail in Figs. 6 to 9, and 13 to 15. It is located between the shafts C and C', which carry at their front-ends respectively the die-heads with the crosshead and eye-bending devices. It is supported between a lower transverse bridge-plate $A^6$, which connects the supporting side-standards $A'$, $A^3$ of the frame A, and an upper bridge or cap-plate $A^7$ between which and the lower bridge $A^6$ a space is formed, for guiding a vertical, reciprocating slide-plate Q in ways of the lower and upper bridge-plates in line with the central vertical longitudinal plane of the machine and parallel with the axes of the shafts of the crosshead and eye-bending devices. Reciprocating motion is imparted to the vertical slide-plate Q by means of two cranks $q'$, $q^2$, which are mounted at an angle of 90° to each other on an auxiliary shaft $S^2$ that receives rotary motion from an intermediate shaft $S'$ by bevel gear wheels $c$, $c'$. The shaft $S^2$ is supported transversely to the longitudinal axis of the machine in bearings of the lower bridge-plate $A^6$. The auxiliary shaft $S^2$ passes through a horizontal slot $q$ in the slide-plate Q. The cranks $q'$, $q^2$ are provided at their ends with anti-friction rollers $q^3$, $q^4$, which engage cam-pieces $q^5$, $q^6$, that are attached to opposite sides and at diagonally-opposite points of the vertical slide-plate Q, the crank $q'$ and cam-piece $q^5$ producing the forward motion and the crank $q^2$ and cam-piece $q^6$ the return-motion of the slide-plate. The cam-pieces $q^5$, $q^6$, are attached by means of screws to the slide-plate Q and provided with slightly-inclined faces having straight upper and lower ends for taking up the action of the anti-friction rollers at the ends of the cranks. Integrally with the hub of the crank $q'$ is made a semi-circular locking-cam $q^7$, the inner straight edge of which is in line with the center-line of the crank $q'$ and which is recessed at one end so as to extend around the anti-friction roller of the crank $q'$, and rounded off at the opposite end, as shown in Fig. 6. In place of making the locking-cam $q^7$ in one piece with the hub of the crank $q'$, it may be made in a separate piece and attached by screws or otherwise thereto. The object of the locking-cam $q^7$ is to hold the vertical slide-plate Q rigidly in position after it has been moved by the crank $q'$ into its extreme forward position, as shown in dotted lines in Fig. 6, in which position it acts on the face of the straight lower portion of the upper cam-piece $q^5$ of the slide-plate and is held in contact therewith while the crank $q^2$ and locking-cam $q^7$ continue their rotary motion for such a length of time until the work of the crosshead and eye-bending, wire-clamping, shank-twisting and ejecting devices is completed. When the second crank $q^2$ has moved through an angle of 270°, it acts on the lower cam-piece $q^3$ at the opposite side of the slide-plate Q and returns, by completing its rotation, the slide-plate into its former initial or starting position, as shown in full lines in Fig. 6. The alternating motion of the cams $q'$, $q^2$, produces the reciprocating motion of the slide-plate while the locked position of the same in its forward position is produced by the semi-circular locking-cam.

The vertical reciprocating slide-plate Q forms the motion-transmitting organ by which the operative parts of the machine are placed in their different working positions. It performs a four-fold function: firstly, of oscillating the shifting lever L of the power-shifting mechanism from one side to the other by means of a suitable intermediary mechanism; secondly, of supporting the laterally-shiftable heads $L^2$ for operating the sliding sleeves on the shafts of the crosshead and eye-bending devices; thirdly, of shifting a clutch-device by means of which rotary motion is imparted to the shafts of the crosshead and eye-bending devices, into mesh with the motion-transmitting gears; and fourthly, of producing the withdrawal of the locking-bolt from the main driving gearwheel of the motion-transmitting mechanism during its forward motion and the relocking of the main gearwheel during the return-motion of the slide-plate and after the twisting of the shanks of the crossheads or eyes is completed.

The primary function of the reciprocating slide-plate Q, namely, the oscillation of the shifting lever L, is accomplished by a mechanism interposed between the upper rear-corner of the slide-plate and the rear-end of the lever L. The lever L is fulcrumed to a raised seat on the central portion of the cap-plate $A^7$ and extended at both ends beyond the cap-plate. The rear-end of the lever L is acted upon by the oscillating mechanism, which consists of a rack-bar $l$, attached to the upper rear-corner of the slide-plate Q and a cam-shaft $l'$, supported in neck-bearings of an extension-plate L'. The rack-bar $l$ intermeshes with a loose pinion $l^2$ on the cam-shaft $l'$ and imparts intermittent rotary motion thereto by the forward and return-motion of the rack-bar $l$. The cam-shaft $l'$ carries at its upper end a cam $l^3$ having a semi-circular face-recess in its upper part, as shown clearly in Figs. 13, 14 and 15. A disk $l^4$ on the shaft $l'$, adjacent to the pinion $l^2$ carries a spring-actuated check-pawl $l^5$ which engages either one of two diametrical notches $l^6$ of a second smaller collar $l^7$ which is keyed to the cam-shaft $l'$ and which serves for transmitting the rotary motion imparted to the pinion $l^2$ by the rack-bar $l$ to the cam-shaft $l'$ and the recessed cam $l^3$ at the upper end of the same. At opposite sides of the extension-plate L' are mounted pivoted elbow-levers $l^8$ and $l^9$, one lever being pivoted sidewise of the fulcrum of the shifting-lever L and the other lever at the opposite rear-corner of the extension-plate L', said pivoted elbow-levers being provided with hooks $l^{10}$ which are connected by a helical spring $l^{11}$ that extends over the rear-end of the shifting lever L and presses the end of one of the elbow-levers against the face of the semi-circular top-portion of the recessed cam $l^3$ of the cam-shaft $l'$ according to the motion transmitted to the pinion during the backward or forward motion of the rack-bar $l$. To the rear-end of the shifting lever L is applied a raised rear-portion $L^3$ which is on a level with the ends of the elbow-levers $l^8$ and $l^9$, so that the pivoted elbow-levers can act alternately on the shifting-lever and oscillate thereby the same from one side to the other of the longitudinal axis of the machine. The oscillating motion of the shifting-lever L from one side to the other is so timed by the reciprocating motion of the slide-plate and the motion of the rack-bar and pinion by which the recessed locking-cam is turned that the pivoted elbow-levers are placed either into the position shown in full lines in Fig. 13, or into their shifted position, which like the shifting-lever is shown in dotted lines in the same figure. At the end of the semi-circular turning motion of the cam-shaft, the cam $l^3$ is locked by a spring-actuated check-pawl $l^{12}$ which engages one of two diametrically-opposite notches in the lower part of the cam $l^3$, as shown in Fig. 13. On the extension-plate L', but in front of the fulcrum of the shifting lever L, are located stationary checks $l^{13}$, which are provided with inclined-faces that act as stops for holding the front-end of the shifting-lever L in its proper position while the rear-end of the same is held in locked position by the face of the recessed locking-cam $l^3$. The front-end of the shifting-lever L is fork-shaped, the fork-shaped end serving for engaging a fixed upright finger $l^{14}$ at the center of the laterally-shiftable slide-heads $L^2$, which are supported in a guide-box $l^{15}$, having a slotted top-plate $l^{16}$ at the upper front-corner of the slide-plate, as shown clearly in Figs. 6, 7 and 14.

To the upper front end of the cap-plate $A^7$ is attached a forwardly-projecting center-plate $L^4$ which is located below the forked front-end of the shifting-lever L and provided with parallel guide-slots $l^{17}$, equal in length with the forward motion or stroke, imparted to the reciprocating slide-plate Q so that the upright shifting-finger $l^{14}$ can move with the laterally-shifting slide-heads $L^2$ and the sliding-sleeves B or B' on the shafts C, C' in forward direction. The recess in the forked front-end of the shifting-lever L is made V-shaped, the sides of the V-shaped recess being arranged in such a manner that when one side is in line with the inner edge of one of said guide-slots, the shifting-lever is in one position while when the other side of the V-shaped recess is in line with the inner edge of the other guide-slot, the shifting-lever is placed in its second or shifted position, as shown in Fig. 1, and respectively in full lines and dotted lines in Fig. 13.

The laterally-shifting slide-heads $L^2$ engage either one or the other of the sliding-sleeves B or B' on the shafts C, C' of the crosshead or eye-bending devices and shifts them alternately into forward or backward position on the shafts C, C' by the reciprocating motion of the slide-plate Q. The opposite end of the laterally-shifting slide-heads $L^2$ moves clear of the sliding-sleeve on the opposite shaft so as not to move the same while the bending devices on the first shaft are actuated by the shifting slide-piece on the same for bending either the crosshead or the eye at the ends of the wire-blanks fed into the machine.

The lower front-end of the reciprocating slide-plate Q is provided with a forwardly and downwardly-extending hanger-portion $q^8$ which is separated by a recess $q^9$ from its main-portion. The lower part of the hanger-portion $q^8$ forms a bearing for the front-end of a longitudinally-sliding center-shaft $S^3$ which is supported by and turning freely in a second hollow shaft $S^4$ that is supported in suitable journal-bearings at the underside of the lower bridge-plate $A^6$ of the machine-frame. A collar $f'$ at the front-end as well as a collar $f^2$ attached to the rear-end of the longitudinally-sliding center-shaft $S^3$ holds the same in proper position in the hollow shaft $S^4$ and limits its motion in the bearings of the lower bridge-plate $A^6$. To the read-end of the shaft $S^3$ is keyed a movable clutch-member $f^3$ which, when the slide-plate Q arrives at the end of its forward motion, is placed into mesh with a fixed clutch-member $f^4$ on a sprocket-wheel $w^2$ that is mounted loosely on the hollow shaft $S^4$ so as to impart rotary motion by a sprocket-wheel and chain transmission to the shaft $S^3$ and the shank-twisting mechanism connected therewith. Rotary motion is imparted to the sprocket-wheel $w^2$ by a sprocket-chain transmission from an intermediate shaft S' which is driven by a gearwheel transmission from the main driving-shaft S to which rotary motion is imparted by a belt and pulley-transmission from an overhead shaft or an electric motor, as desired. A main gear-wheel $m$ is mounted fast on the hollow shaft $S^4$ and intermeshes at one side with an intermediate gearwheel $f^o$ and at the opposite side with a gearwheel $f^x$ of slightly smaller size, which gearwheels again mesh with gearwheels $f^5$, $f^6$, of the same size as the intermediate gearwheels respectively on the shafts C, C' of the crosshead and eye-bending devices, as shown clearly in Fig. 5. The ratio of the transmitting motion of the gearwheels $f^o$, $f^5$, for the crosshead-bending devices is such that for one full rotation of the main gearwheel $m$ three twists are formed on the shank of the crosshead, while for one full rotation of the main gearwheel $m$ the gearwheels $f^x$, $f^6$ impart four rotations to and form four twists to the shank of the eye of the bale-wire. The front-end of the longitudinally-shifting shaft $S^3$ is provided in the lower recessed portion of the reciprocating slide-plate Q with a disk $f^7$ which is keyed to the shaft $S^3$, said disk engaging during the forward motion a collar $f^9$ on a horizontally-guided locking-bolt $f^8$ that is located sidewise of and parallel with the shifting-shaft $S^3$ and guided in the bearings below the lower bridge-plate, the middle portion of the locking-bolt $f^8$ being provided with a fixed collar $f^{13}$ and a helical spring $f^{10}$ between said collar and the left-hand bearing, while its rear-end projects beyond the right-hand bearing on the lower bridge-plate and is slightly tapered so as to be adapted to engage a socket-hole $f^{11}$ in the web of the main driving gearwheel $m$ as soon as the twisting of the shank of the crosshead or of the eye of the bale-tie is completed. The rearward motion of the locking-bolt $f^8$ into locking engagement with the socket-hole $f^{11}$ of the main gearwheel $m$ is accomplished as soon as one full rotation of the main gearwheel is completed, in which case a spring-latch $f^{12}$ mounted on the disk $f^7$ is placed in line with a segmental recess $f^{14}$ on the circumference of the disk so that the latch is permitted to "give" under the pressure of the collar at the front-end of the locking-bolt $f^8$ and cause the latter to clear the recess of the disk and move under the action of its helical spring $f^{10}$ instantly into the socket-hole of the main gearwheel so as to lock it rigidly in position during the time when the rotary motion of the main gearwheel for producing the twisting of the shanks of the crossheads or eyes is not required.

*The crosshead bending devices.*—The crosshead made by the bending devices is shown in Fig. 31, and the crosshead bending devices themselves in Figs. 25 to 28. They are operated by a sliding-sleeve B located on the horizontal shaft C of the crosshead-bending devices, alternately with the eye-bending devices which are operated by a sliding-sleeve B' on the shaft C'. The shafts C, C' are arranged sidewise of and parallel with each other and supported in bearings of upright standards $A^2$ and $A^3$ which are attached to the supporting-frame of the machine. The sliding-sleeves B and B' are engaged alternately by the transverse slide-heads $L^2$ which are reciprocated by the vertical slide-plate Q and alternately shifted from one side to the other by the shifting-lever L. The sliding-sleeves B, B' are connected with the shafts C, C' by transverse keys $b^o$ which are guided in slots b' of the shafts. The sleeves B, B' are provided with flanges at opposite ends, the front-flanges being provided with ears $b$ which by means of intermediate link-connections serve for operating the primary and hook-bending levers of the crosshead or eye-bending devices. To the ends of the shaft C, C' are applied die-heads E, E$^x$ on which the operating parts of the crosshead and eye-bending devices are mounted. The die-head E of the crosshead-bending devices is formed of an L-shaped forwardly-projecting plate which carries at one side the primary bending-lever E' which is bent at an obtuse angle so as to correspond with the angle formed by the forward end of the crosshead toward the wire-blank $z$ to be bent, said lever being attached to an arm $e^2$ of a pivot $e^3$ that is journaled in the die-head E, as shown in Figs. 25 and 26. A fixed bending pin $e^4$ projects centrally from the end of the pivot $e^3$ while a pinion $e^5$, that is engaged by a gearwheel $e^6$, is keyed to the opposite end of the pivot $e^3$ and located like the gearwheel $e^6$ on the opposite side of the die-head E. The gearwheel $e^6$ is mounted on a pivot of the die-head E and rotated by the forward motion of the sliding-sleeve B through the medium of a pivot-link $b^2$ which is connected with the ear $b$ on the front-flange of the sleeve B and by a front-shoulder $b^3$ with a crank-pin $b^4$ on the gearwheel $e^5$. The pivot-link $b^2$ is guided by means of a longitudinal slot $b^5$ on a fixed pin $b^6$ of the die-head. The motion imparted by the front-shoulder $b^3$ of the pivot-link $b^2$ imparts the required rotary motion to the gearwheel $e^6$ for swinging by means of the intermeshing pinion $e^5$ the primary bending-lever E' and thereby the end of the wire-blank around the projecting bending-pin $e^4$ and backwardly over the wire-blank, as shown clearly in dotted lines in Fig. 25, the obtusely-shaped bending-lever E' producing at the same time the obtuse angle at the front-part of the crosshead.

A second or hook-bending lever F is fulcrumed to a pivot $f^{15}$ on the lower front-part of the die-head E and provided with a hook-shaped projection $f^{16}$ by which the wire-blank $z$ is bent around a second stationary bending pin $f^{17}$ of the die-head, which pin is located in front of the pin $e^4$ so as to form the hook-portion of the crosshead. A cam-surface $f^{18}$ on the upper edge of the hook-bending lever F serves for pressing an intermediate spring-actuated bending-lever F', which is pivoted to the die-head E, against the hook-shaped end of the wire-blank, said lever F' being located between the lower part of the primary bending lever E' and the hook-bending lever F, as shown clearly in Figs. 25 and 27, so as to bend the portion of the wire-blank inwardly between the bending pins $e^4$ and $f^{17}$. The rear-end of the primary bending-lever F is provided with bent-over lugs $e^7$ by which the wire-blank $z$ together with the bent-over portion is held in proper position for the wire-clamping mechanism, which will be described later on. The hook-bending lever F is operated by a pivot-link $f^{19}$ which connects its lower rear-end with a second ear $b^x$ at the lower part of the front-flange of the sliding-sleeve B. A cheek $e^8$ on the arm $e^2$ of the lever E' serves for holding the bent-over end of the wire-blank at one side while an oblong cheek $e^9$ located sidewise of the hook-bending lever F holds the crosshead formed by the bending levers on the other side. A laterally-projecting latch $e^{10}$ guided at the forward end of the die-head is beveled downwardly and acted upon by a flat spring $e^{11}$ attached to the opposite side of the die-head, as shown in Figs. 27 and 26. The latch $e^{10}$ prevents the upward motion of the shank of the cross-head just formed and "gives" under the pressure of the primary-bending lever E' as it swings over with the bent-over wire in forming the crosshead. The keepers $e^8$ and $e^9$ hold the middle portion of the crosshead in position on the bending-pins $e^4$ and $f^{17}$ and keep the cross-head in place in a plane parallel with the die-head, as shown in Fig. 27. The joint operation of the primary bending-lever E', the fulcrumed hook bending-lever F, the intermediate bending-lever F' and the cheeks $e^8$ and $e^9$, produce in connection with the hook bending-pins, the formation of the crosshead, shown in Fig. 31. On the die-head E is further arranged above the end of the hook bending-lever F' a pusher $e^{12}$ which passes through a hole in the die-head E and which is held in position by the tension of a helical spring $e^{13}$ at the opposite side of the same. The pusher $e^{12}$ is attached to a plate $e^{14}$ which is provided with a guide-pin $e^{15}$ and cushioned by a second helical spring $e^{16}$, as shown in Figs. 29 and 30. On the head of the guide-pin $e^{15}$ is placed a wire-spring $e^{17}$ which acts on a latch $e^{18}$ that is pivoted to ears $e^{19}$ on the guide-plate $e^{14}$ and projected into the path of a lug $b^8$ on the sliding pivot-link $b^2$ so that the lug $b^6$ is permitted to pass beyond the pivoted latch $e^{18}$ during its forward motion but actuates the same during its return-motion so that the pusher is moved laterally against the completed crosshead while the crosshead bending-devices are returned from their bending position into their initial or starting position, the pusher pressing the crosshead sidewise and releasing it from the bending-pins ready for the action of the ejecting-devices. The crosshead bending-devices are fully described and claimed in the prior patent referred to and not claimed in this application.

*The eye-bending devices.*—The eye-bending devices are shown in Figs. 32 to 35. They are supported at the front-end of the shaft C' and consist of an L-shaped supporting die-head $E^x$, an eye-bending lever $F^2$ that is attached to a pivot $b^9$ on the head $E^x$ similar to the primary bending-lever E' of the crosshead-bending devices, and intermediate motion-transmitting mechanism for the lever $F^2$ consisting of a gear-wheel $b^{18}$ and pinion $b^{19}$, which are actuated by an intermediate link-connection $b^{10}$ between an ear $b^{11}$ on the sliding-sleeve B' and the crank-pin $b^{16}$ on the gearwheel $b^{18}$. The link $b^{10}$ is provided at its front-end with a lug $b^{20}$ which engages on the return-motion of the link $b^{10}$ the crank-pin $b^{16}$ and returns the gearwheel $b^{18}$, pinion $b^{19}$ and bending lever $F^2$ into their initial positions. The eye-bending lever $F^2$ is provided with a keeper $b^{12}$ that projects over the wire-blank and holds it in position while its end is bent back around a projecting bending-pin $b^{13}$ on the pivot $b^9$ of the bending-lever $F^2$, and past a bending pin $b^{17}$, as shown in Fig. 33. The die-head $E^x$ is provided at its front-end, in line with the upper edge of the bending-lever $F^2$ with an ingoing check $b^{14}$ which is rounded off toward its front-end and which serves for the easy insertion of the wire-blank $z$ and as a proper support for the same during the bending operation. When the end of the wire-blank $z$ has been bent around the bending-pin $b^{13}$, as shown in dotted lines in Fig. 33, the bent-over wire thus formed is taken hold of by the wire-clamping devices, which are in line with the eye-bending devices. In front of the wire-clamping and ejecting-devices are supported on the retaining guide-strips of the ejecting-devices V-shaped guides $d$ which are made of sheet-metal and provided with U-shaped lower parts, as shown clearly in Figs. 1 and 16, and which serve for guiding the wire-blanks when they are inserted toward the slotted eyes of the ejecting-devices adjacent thereto and inwardly over the bending-levers until they abut against the angular portions of the die-heads, as shown in dotted lines in Figs. 25 and 27 for the crosshead, and in Figs. 33 and 34 for the eye of the bale-wire. By the V-shaped guides, the wire-blanks are conveniently and reliably guided into their proper position in the die-heads until arrested by their rear-ends, so as to be acted on by the bending, wire-clamping, shank-twisting and ejecting-devices.

*The wire-clamping devices.*—When the crosshead or eye-bending operation is completed, the wire-blank and the overlapping bent-over end of the same are firmly gripped by a clamping-device preparatory to the twisting operation, that is to be imparted to the shank of the crosshead or eye. The clamping devices are located on the inner side of the front-standard $A^5$ in line with the crosshead and eye-bending devices, and consist each of a stationary clamping cheek $g$ and an elbow-shaped movable clamping-cheek $g'$ fulcrumed to the standard $A^5$, as shown in detail in Figs. 17 and 24. The upper end of the standard $A^5$ is recessed at each corner for receiving the stationary cheek $g$, which forms, in connection with the correspondingly-recessed cheek $g'$ a rigid support for the shank of the crosshead or eye. The upper end of the movable clamping-cheek $g'$ is connected by a helical spring $g^2$ with a center-pin $g^3$ on the supporting standard $A^5$, so as to hold the cheek normally away from the stationary cheek $g$ and against a stop-pin $g^4$ on the standard $A^5$. Oscillating motion is imparted at the proper time to the movable clamping cheek $g'$ by the beveled face of an upright cam $g^5$ attached to a horizontally-reciprocating slide-piece $g^6$, which is actuated by the shifting-sleeve B or B' on the shaft C or C' engaging an upright arm $g^7$ at the rear-end of the slide-piece $g^6$, as shown in Fig. 2 and in detail in Figs. 20 and 21. The slide-piece $g^6$ is guided in a stationary guide-box $g^8$ and moved forward through an opening $g^{10}$ in the standard $A^5$, the clamping-cheeks $g$, $g'$ holding the shank of the crosshead or eye firmly until the shank-twisting operation is completed when the slide-piece $g^6$ and upright arm $g^7$ are returned by the sleeve B or B' to their initial or starting position and the movable clamping-cheek $g'$ by the spring $g^2$ to its stop-pin $g^4$.

*The shank-twisting mechanism.*—The twisting of the shanks of the crossheads or eyes is accomplished by the following mechanism: On the main-shaft S is mounted a pulley P, which receives continuous rotary motion by a belt from a suitable power-shaft and transmits the rotary motion by a pinion and gear wheel $g^{11}$, $g^{12}$ to an intermediate shaft S' and from the latter by a sprocket-wheel $w$ and a sprocket-chain $w'$ to a loose sprocket-wheel $w^2$ on the hollow shaft $S^4$, which latter is supported in bearings at the underside of the table A below the vertical slide-plate Q, as shown in Figs. 1 and 3. On the shaft $S^4$ is mounted, adjacent to the sprocket-wheel $w^2$, the main bevel gearwheel $m$. The sprocket-wheel $w^2$ is thrown into mesh with the shaft $S^3$ by the movable clutch-member $f^3$ on the rear-end of the shaft $S^3$, shown in Fig. 3. The clutch-member $f^3$ is moved forward with the shaft $S^3$ by the forward-motion of the slide-plate Q and engages, as soon as the crosshead or eye-bending and clamping devices have accomplished their functions, the clutch-member $f^4$ on the sprocket-wheel $w^2$ so as to rotate the shaft $S^3$, hollow-shaft $S^4$ and the main gearwheel $m$. Simultaneously with the intermeshing of the clutch-members $f^3$, $f^4$, the locking-bolt $f^8$ of the main-gearwheel $m$, is withdrawn by the action of the disk $f^7$ on the collar $f^9$ at the front-end of the shiftable locking-bolt so that the main gearwheel $m$ is free to rotate. The main gearwheel $m$ intermeshes at one side with the intermediate gearwheel $f^\circ$ and the latter with a gearwheel $f^5$ of equal size on the shaft C of the cross-head bending devices, and on the other side with a gearwheel $f^\times$ and the latter with a gearwheel $f^6$ of equal size on the shaft of the eye-bending devices. Alongside of the gearwheels $f^5$ and $f^6$ on the shafts C, C' are arranged disks $w^7$, $w^8$, which are notched at one point of their circumference and engaged by check-pawls $w^9$, $w^{10}$ which prevent the rotation of the shafts C, C' in a direction opposite to that required for the twisting motion of the shanks of the crossheads and eyes. The gearwheels $f^5$ and $f^6$ are splined to the rear-ends of the shafts C, C', during the shank-twisting operation by the shifting of interior shafts $C^2$, $C^3$, which carry the splines $C^4$ at their rear-ends. The motion-transmitting sprocket-wheels and chain are kept continuously in motion as long as the pulley P is driven from the source of power, the sprocket and chain transmission forming with the main gearwheel $m$ and gearwheels $f^\circ$, $f^5$ and $f^\times$, $f^6$, the means for transmitting rotary motion to the shafts C, C' at the time when the twisting of the shanks of the crossheads or eyes is to be performed. The ratio between the teeth of the main gearwheel $m$ and the teeth of the gearwheels $f^\circ$, $f^\times$ is 3 to 1, so that for each rotation of the main gearwheel three rotations are imparted to the gearwheels $f^\circ$, $f^5$ and three rotations to the shaft C. On the other hand, the ratio between the teeth of the main gearwheel $m$ and the teeth of the gearwheels $f^\times$, $f^6$ is 4 to 1, so that for each rotation of the main gearwheel $m$ four rotations are imparted to the gearwheels $f^\times$, $f^6$ and thereby four rotations to the shaft C'. The motion-transmitting mechanisms for the shank-twisting mechanisms are called into operation by the reciprocating slide-plate Q on the one hand, and the shifting motion of the sliding-sleeves B, B' and the spline-connections of the shafts C, C' with the driving gearwheels $f^5$ and $f^6$ on the other hand, so as to produce either three rotations of the shaft C or four rotations of the shaft C' and the corresponding number of twists on the shanks of the crosshead or eye just formed by the bending devices.

*The ejecting devices.*—The ejecting devices are shown in Figs. 16 to 19. They are located on the front-side of the upright front-standard $A^5$ adjacent to the clamping-devices on the rear-side of the same. They consist of oscillating-levers $t$ which are formed of lower portions or arms $t'$ that are fulcrumed at their lower ends at $t^2$ to the upright standard $A^5$ and of angular and outwardly-bent upper portions or arms $t^3$. The lower arm of each ejector is provided with parallel ribs $t^4$, and with a hinged and spring-actuated latch $t^5$ that projects over and beyond the inner edge of the lower ejector-arm, and that is provided with a nose $t^6$ at the inner lower end so as to be engaged by a cam $g^9$ on the horizontally-reciprocating slide-piece $g^6$ of the wire-clamping device which cam is passed through the opening $g^{10}$ of the standard $A^5$. The front-edge of the cam $g^9$ on the reciprocating slide-piece $g^6$ is straight, and the rear-edge inclined in downward direction, as shown in Figs 20 and 21. The front-edge of the cam $g^9$ of each slide-piece $g^6$ engages the hinged and spring-actuated latch $t^5$ on the ejector-arm $t'$, when moved in forward direction so as to swing the latch forward against the tension of its spring into the position shown in dotted lines in Fig. 23. Adjacent to the cam $g^9$ is arranged on the slide-piece $g^6$ a shoulder $t^7$, which acts on the return-motion of the slide-piece on the latch $t^5$ and raises it with the ejector so as to swing it with the same into the intermediate position shown in dotted lines in Fig. 18, and produce the slipping out of the shank of the crosshead or eye from the slotted eye $t^8$ of the ejector. By the continuation of the return motion of the slide-piece $g^6$, the inclined rear-portion of the cam $g^9$ engages the latch $t^5$ and swings it with the ejector-arm quickly in lateral direction into the second position, shown in dotted lines in Fig. 18, so as to eject the bale-wire which is moved quickly along the angular inner edge of the ejector toward one side of the machine. As soon as the ejecting action has taken place, the ejector is returned with the latch $t^5$ by the action of a helical spring $t^9$ between the ejector-arms into its former position, as shown in full-lines in Fig. 16, and is arrested by a stop-shoulder $t^{10}$ of its guide-strip $t^{11}$ attached to the upper front-edge of the standard $A^5$. The reciprocating slide-pieces $g^6$ are engaged and actuated by the sliding-sleeves B, B' on the shafts C, C' of the crosshead and eye-bending devices, as shown in Fig. 3, so as to move forward with the sliding-sleeves during the bending operation for operating the wire-clamping devices and return with the sliding-sleeves after the shank-twisting operation is completed for actuating the ejecting devices. From the upper corners of the upright standard $A^5$ extend in downward direction at both ends of the standard curved guide-bands $t^{12}$ which are bent inwardly at their lower ends and attached to the frame A of the machine, as shown clearly in Figs. 1, 2 and 16. The curved bands $t^{12}$ serve as guides for the completed wire bale-ties when they are thrown off at opposite sides of the machine by the ejecting devices.

*Operation.*—The operation of my improved machine for bending the crossheads and eyes of wire bale-ties is as follows: After inserting the wire-blank $z$ into proper position through the guide-devices and eyes of the ejecting devices into the crosshead or eye-bending devices, and placing the power-belt on the pully P, the hand-lever H is operated so that the clutch-member $n$ on the shaft $S^2$ is placed into mesh with the clutch-member $n'$ on the bevel-gear wheel on the shaft $S^2$ and the same rotated. The rotation of the shaft $S^2$ imparts forward motion by the crank $q$ to the vertical slide-plate Q and by the shifting lever L' the required lateral motion to the transversely-sliding heads $L^2$ so that the sliding-sleeve B on the shaft C is engaged and shifted in forward direction for actuating by the intermediate mechanism the bending-devices and bend thereby the end of the wire-blank $z$ into the shape of the crosshead, as shown in Fig. 31, and described in connection with the crosshead bending-devices. As soon as the bending-operation is completed, the shank of the crosshead is firmly taken hold of by the clamping-devices, ready for the operation of the shank-twisting mechanism. The bending of the end of the wire-blank into the form of a crosshead, the clamping of the shank of the same and the twisting of the shank are so timid as to take place in proper succession by the motion of the reciprocating slide-plate Q on the shifting-lever L' and heads $L^2$ and on the clamping-devices and shank-twisting mechanisms described. On the return of the reciprocating slide-plate Q and the bending-devices into their initial or starting positions, the crosshead formed at the end of the wire bale-tie is released from the bending-devices by the spring-actuated and laterally-movable pusher and subjected to the action of the ejector which throws the bale-tie, with the crosshead formed thereon, quickly sidewise out of the machine. Simultaneously with the return of the shifting-sleeve B and die-head E into their former position, the power-shifting mechanism is operated and the lever L' shifted in the manner before described, so that the power is shifted by the shiftable heads $L^2$ from the shaft C of the crosshead-bending devices to the shaft C' of the eye-bending devices, the shaft C remaining in a position of rest. By the next forward motion of the reciprocating slide-plate Q, the shifting-sleeve B' on the shaft C' is moved in forward direction so as to act on a second wire-blank, inserted into the eye-bending devices, and bend its end into the form of the eye, shown in Fig. 35, which is then clamped, its shank twisted and the wire ejected at the opposite side of the machine, in the same manner as the bale-wire with the crosshead formed thereon. The return-motion of the slide-plate produces again the operation of the power-shifting mechanism so as to place the shifting-lever L' and laterally-shifting heads $L^2$ into engagement with the sliding-sleeve B on the shaft C, and produce by the next forward motion of the slide-plate Q the actuation of the crosshead-bending, wire-clamping and shank-twisting devices, and so on alternately the formation of crossheads or eyes at the ends of the wire-blanks and their ejection by the ejecting devices at opposite sides of the machine.

The machine hereinbefore described is arranged with crosshead and eye-bending devices which are alternately operated by the automatically-operated power-shifting mechanism. In place of the die-heads forming the crossheads and eyes shown, other die-heads with modified bending-devices may be attached to the shafts C, C' of the bending-devices, so as to permit the use of the machine for the bending of arrow or other shaped crossheads and differently-shaped loops for the same.

The improved machine herein described for bending crossheads and eyes of wire bale-tires has the advantage that by the great simplification of the power-shifting mechanism the number of operative parts is greatly diminished and the automatic shifting of the power from the shaft of the crosshead bending-devices to the shaft of the eye-bending devices, after the machine is started, simplified to such an extent that a very large number of wire bale-tires can be completed within a given time by only one attendant for feeding the wire-blanks alternately to the bending-devices. Owing to the improved construction of the machine it is less liable to injury and breakage so that the frequent repairs heretofore necessary with this type of machine are to a great extent obviated while such repairs as become necessary can be made by the substitution of interchangeable reserve-parts without returning the machine for repairs to the place of manufacture.

I claim:

1. In a machine for bending the crossheads and eyes of wire bale-ties, the combination, with the crosshead and eye-bending devices and their shafts, of sliding-sleeves on said shafts, actuating means between the sliding-sleeves and the bending-devices, a reciprcating slide-plate, and a power-shifting mechanism interposed between the slide-plate and the sliding-sleeves or imparting alternately reciprocating motion to the sliding-sleeves for actuating the crosshead or eye-bending devices.

2. In a machine for bending the crossheads and eyes of wire bale-ties, the combination, with separate crosshead and eye-bending devices and their shafts, of sliding-sleeves on said shafts, means connecting said sleeves with the bending-devices for actuating the same, a reciprocating slide-plate, means between said slide-plate and the sliding-sleeves for actuating the latter by the forward and backward movement of the slide-plate, and a power-shifting mechanism operated by the slide-plate for actuating alternately the sliding-sleeves of the crosshead or eye-bending devices.

3. In a machine for bending the crossheads and eyes of wire bale-ties, the combination, with separate crosshead and eye-bending devices and their shafts, of sliding-sleeves on said shafts, means for connecting said sleeves with the bending-devices, laterally-shifting heads engaging alternately the sliding-sleeves of the crosshead or eye-bending devices, a reciprocating slide-plate, means on the slide-plate for guiding said heads, and a power-shifting mechanism connected with the slide-plate for actuating the laterally-shifting heads.

4. In a machine for bending the crossheads and eyes of wire bale-ties, the combination, with separate crosshead and eye-bending devices and their shafts, of sliding-sleeves guided on the shafts, means for connecting said sleeves with the bending-devices, laterally-shiftable heads adapted to engage alternately one or the other of the sliding-sleeves, a shifting lever connected with said shiftable heads, a reciprocating slide-plate, means on the front-end of said slide-plate for guiding the shiftable heads, a power-shifting lever, and means located at the rear-end of said slide-plate for intermittently actuating said shifting lever and moving the shiftable heads into connection with one or the other sliding-sleeve.

5. In a machine for bending the crossheads and eyes of wire bale-ties, the combination, with separate crosshead and eye-bending devices and their shafts, of sliding-sleeves guided on the shafts, means for connecting said sleeves with the bending-devices, laterally-shiftable heads, a reciprocating slide-plate, a forked shifting lever connected with said separate shiftable heads, and a power-shifting mechanism operated by the slide-plate for oscillating the shifting lever and moving the shiftable heads alternately into engagement with one or the other sliding-sleeve.

6. In a machine for bending the crossheads and eyes of wire bale-ties, the combination, with the crosshead and eye-bending devices and their shafts, of sliding-sleeves on said shafts, operating means between the sliding-sleeves and the bending devices, laterally-shiftable heads engaging said sliding-sleeves, a reciprocating slide-plate, a guide-box for the laterally-shiftable heads supported at the front-end of the slide-plate, an upright center-finger on said shiftable heads, a stationary guide-plate having transverse and longitudinal slots for guiding said finger, a fulcrumed shifting lever provided with a forked front-end, engaging said finger, and mechanism interposed between the slide-plate and the rear-end of the shifting lever for oscillating the same and moving the shiftable heads alternately into engagement with one or the other sliding-sleeve.

7. In a machine for bending the crossheads and eyes of wire bale-ties, the combination, with the crosshead and eye-bending devices and their shafts, of sliding-sleeves on said shafts, laterally-shiftable heads engaging said sliding-sleeves, a reciprocating slide-plate, a guide-box for the laterally-shiftable heads supported on the slide-plate, a center-finger on said shiftable heads, a stationary longitudinally and transversely guide-slotted plate for guiding said finger, a fulcrumed shifting lever provided with a forked front-end, stationary cheeks having inclined faces at opposite sides of the shifting lever, and mechanism interposed between the slide-plate and the rear-end of the shifting lever for oscillating the same and moving the shiftable heads alternately into engagement with the sliding-sleeves of the crosshead or eye-bending devices.

8. In a machine for bending the crossheads and eyes of wire bale-ties, the combination, with the crosshead and eye-bending devices and their shafts, of sliding-sleeves on said shafts, a lower bridge-plate, an upper cap-plate, a vertical slide-plate guided in said bridge and cap-plate, means for imparting reciprocating motion to said slide-plate, means for locking the slide-plate on arriving in its forward position, a guide-box supported at the upper front-part of the slide-plate, laterally-shiftable heads guided in said box, a shiftable lever fulcrumed to the cap-plate, means for connecting the shifting lever with the laterally-shiftable heads, and means interposed between the rear-end of the slide-plate and the shifting lever for actuating the shifting lever, shiftable heads and sliding-sleeves.

9. In a machine for bending the crossheads and eyes of wire bale-ties, the combination, with the crosshead and eye-bending devices and their shafts, of sliding-sleeves on said shafts, means for shifting said sliding-sleeves, a vertical slide-plate located between said shafts, means for imparting reciprocating motion to the same, a power-shifting mechanism operated by the slide-plate for actuating alternately the sliding-sleeves of the crosshead or eye-bending devices, means for locking the slide-plate in its forward position, and means for returning the slide-plate and the parts connected therewith into their initial or starting position.

10. In a machine for bending the crossheads and eyes of wire bale-ties, the combination, with the crosshead and eye-bending devices and their shafts, of sliding-sleeves on said shafts, actuating means between the sliding-sleeves and bending devices, a reciprocating slide-plate, laterally-shiftable heads guided on said slide-plate, a power-shifting mechanism operated by said slide-plate and connected with said shiftable heads, and means for imparting reciprocating motion to said slide-plate, comprising a rotary shaft passing through a horizontal slot of the slide-plate, cranks on opposite sides of the slide-plate, cam-pieces on opposite sides of said slide-plate, and a semi-circular locking cam adapted to lock the slide-plate in forward position during the actuation of the crosshead and eye-bending devices.

11. In a machine for bending the crossheads and eyes of wire bale-ties, the combination, with the crosshead and eye-bending devices and their shafts, of sliding-sleeves on said shafts, means between said sleeves and the bending devices for actuating the latter, a vertical slide-plate guided in ways between said shafts, means for reciprocating said slide-plate, a power-shifting mechanism operated by said slide-plate for shifting one or the other sliding-sleeve on its shaft, shank-twisting mechanisms connected with the slide-plate, and means for actuating the shank-twisting mechanisms after the actuation of the crosshead or eye-bending devices is completed.

12. In a machine for bending the crossheads and eyes of wire bale-ties, the combination, with the crosshead and eye-bending devices and their shafts, of sliding-sleeves on said shafts, means between the sliding-sleeves and the bending devices for actuating the same, a power-shifting mechanism for shifting alternately the sliding-sleeves of the crosshead or eye-bending devices, a vertical reciprocating slide-plate actuating said power-shifting mechanism, shank-twisting mechanism connected with said slide-plate, and motion-transmitting mechanism for actuating alternately the shank-twisting mechanisms of the crosshead or eye-bending devices.

13. In a machine for bending the crossheads and eyes of wire bale-ties, the combination, with the crosshead and eye-bending devices and their shafts, of sliding-sleeves on said shafts, actuating means between the sliding-sleeves and the bending devices, power-shifting mechanism for alternately actuating the sliding-sleeves, a reciprocating slide-plate connected with said power-shifting mechanism for actuating the same, shank-twisting mechanisms connected with the shafts of the crosshead or eye-bending devices, means connecting the slide-plate with the shank-twisting mechanisms, means for locking or releasing said shank-twisting mechanisms, a motion-transmitting mechanism, and means actuated by the slide-plate for moving the motion-transmitting mechanism into mesh with the shank-shifting mechanisms for operating the latter at the proper time.

14. In a machine for bending the crossheads and eyes of wire bale-ties, the combination, with the crosshead and eye-bending devices and their shafts, of sliding-sleeves on said shafts, means between said sliding-sleeves and the bending devices for actuating the latter, a reciprocating slide-plate guided in ways between said shafts, a power-shifting mechanism actuated by said slide-plate, shank-twisting mechanisms, means for connecting said slide-plate with the shank-twisting mechanisms, wire-clamping devices located in front of the crosshead and eye-bending devices, means for connecting the sliding-sleeves with the wire-clamping devices, ejecting devices arranged adjacent to the wire-clamping devices, means for actuating the same at the proper time, motion-transmitting mechanism for the shank-twisting mechanisms, and means for throwing the motion-transmitting mechanism into mesh with the shank-twisting mechanisms for producing the alternating operation of the crosshead or eye-bending, wire-clamping, shank-twisting, motion-transmitting and ejecting devices.

15. In a machine for bending the crossheads and eyes of wire bale-ties, the combination, with separate crosshead and eye-bending devices and their shafts, of sliding-sleeves on said shafts, means between said sleeves and the bending devices for actuating the latter, means for alternately shifting the sliding-sleeves on their shafts, wire-clamping devices in line with the crosshead or eye-bending devices, ejecting devices adjacent to said clamping devices, and slide-pieces actuating the wire-clamping and ejecting devices, said slide-pieces being provided with arms connected with the sliding-sleeves for being reciprocated by the same.

16. In a machine for bending the crossheads and eyes of wire bale-ties, the combination, with separate crosshead and eye-bending devices and their shafts, of sliding-sleeves on said shafts, wire-clamping devices in line with the bending devices, reciprocating slide-pieces connecting the sliding-sleeves and the wire-clamping devices, a power-shifting mechanism engaging alternately said sliding-sleeves, a reciprocating slide-plate, shank-twisting mechanisms, means for throwing the shank-twisting mechanisms into operation after the crosshead or eye-bending devices have been actuated, and means for returning the bending, wire-clamping and shank-twisting devices into their initial or starting positions.

17. In a machine for bending the crossheads and eyes of wire bale-ties, the combination, with separate crosshead and eye-bending devices and their shafts, of sliding-sleeves on said shafts, means between the sliding-sleeves and the bending devices for actuating the latter, and a power-shifting mechanism located between the shafts of said bending devices, said power-shifting mechanism comprising a vertical slide-plate, means for imparting reciprocating motion to the same, cranks at the opposite sides of said slide-plate, a semi-circular locking cam on one of said cranks, cam-pieces at opposite sides of said slide-plate, a fulcrumed shifting lever, means for alternately moving said shifting lever from one side to the other, and laterally-shiftable heads actuated by said levers and adapted to be alternately placed into engagement with the sleeves of the cross-head or eye-bending devices.

18. In a machine for bending the crossheads and eyes of wire bale-ties, the combination, with separate crosshead and eye-bending devices and their shafts, of sliding-sleeves on said shafts, actuating means between said sliding-sleeves and bending devices, laterally-shiftable heads between said sleeves, a shifting lever connected with said shiftable heads for actuating the same, a vertical reciprocating slide-plate supporting said laterally-shiftable heads, and means between said slide-plate and the shifting lever for oscillating the latter.

19. In a machine for bending the crossheads and eyes of wire bale-ties, the combination, with separate crosshead and eye-bending devices and their shafts, of sliding-sleeves on said shafts, actuating means between the sliding-sleeves and the bending devices, laterally-shiftable heads for engaging alternately said sleeves, a reciprocating slide-plate, means on said slide-plate for guiding the shiftable heads, a fulcrumed shiftable lever, means between said slide-plate and the shifting lever for oscillating the latter, shank-twisting mechanisms connected with the shafts of the bending-devices, a motion-transmitting mechanism, and means actuated by the slide-plate for throwing said motion-transmitting mechanism into or out of mesh with the shank-shifting mechanisms as soon as the actuation of the crosshead or eye-bending devices is completed.

20. In a machine for bending the crossheads and eyes of wire bale-ties, the combination, with separate crosshead and eye-bending devices and their shafts, of sliding-sleeves on said shafts, means between said sleeves and the bending devices for actuating the latter, a reciprocating slide-plate, a guide-box supported on said slide-plate, laterally-shiftable heads supported in said guide-box and engaging alternately said sliding-sleeves, a fulcrumed shifting lever, means between the slide-plate and the shifting lever for oscillating the latter, the front-end of said shifting lever being connected with the laterally-shiftable heads, shank-twisting mechanisms connected with the rear-ends of said shafts, a motion-transmitting mechanism, and clutch-devices operated by the slide-plate for throwing the motion-transmitting mechanism into mesh with the shank-twisting mechanisms for alternately rotating the shafts of the bending devices.

21. In a machine for bending the crossheads and eyes of wire bale-ties, the combination, with separate crosshead and eye-bending devices and their shafts, of sliding-sleeves on said shafts, a vertical reciprocating slide-plate, means for shifting the sliding-sleeves, wire-clamping devices arranged in line with the bending-devices, reciprocating slide-pieces connecting said sliding-sleeves with the wire-clamping devices, said clamping-devices being formed of a stationary and a movable die, and cams on said slide pieces for oscillating the movable dies.

22. In a machine for bending the crossheads and eyes of wire bale-ties, the combination, with separate crosshead and eye-bending devices and their shafts, of sliding-sleeves on said shafts, means between said sleeves and the bending-devices for actuating the latter, a vertical reciprocating slide-plate guided between said shafts, a guide-box supported on said slide-plate, laterally-shiftable heads supported in said guide-box, an oscillating shifting lever actuated by the slide-plate for moving said shiftable heads from one side to the other, separate wire-clamping devices in line with the bending-devices, oscillating ejectors arranged adjacent to said wire-clamping devices, and means interposed between the sliding-sleeves and the wire-clamping and ejecting devices for actuating the same at the proper time.

23. In a machine for bending the crossheads and eyes of wire bale-ties, the combination, with separate crosshead and eye-bending devices and their shafts, sliding-sleeves on said shafts, means between said sleeves and the bending-devices for actuating the latter, and two sets of wire-clamping, shank-twisting and ejecting devices, of a reciprocating slide-plate guided between said sets of wire-forming devices, intermediate actuating mechanisms between said slide-plate and the bending, wire-clamping, shank-twisting and ejecting devices, and motion-transmitting mechanisms between the slide-plate and wire-forming devices for alternately actuating the crosshead or eye-bending devices and successively operating their wire-clamping, shank-twisting and ejecting devices.

24. In a machine for bending the crossheads and eyes of wire bale-ties, the combination, with separate crosshead and eye-bending devices and their shafts, of sliding-sleeves on said shafts, means between said sleeves and the bending-devices for actuating the latter, a vertical reciprocating slide-plate, laterally-shiftable heads supported on and guided on said slide-plate, pivoted and spring-actuated ejectors arranged in line with the bending-devices, an oscillating shifting lever, means between the slide-plate and said lever for oscillating the latter, means for connecting the shifting lever with the laterally-shiftable heads, and reciprocating slide-pieces between the sliding-sleeves and the ejectors for oscillating the latter and throwing out the finished bale-ties alternately at opposite sides of the machine.

25. In a machine for bending the crossheads and eyes of wire bale-ties, the combination, with the cross-head and eye-bending devices and their shafts and sliding-sleeves, of wire-clamping devices, means for locking or releasing the same, pivoted and spring-actuated ejectors arranged adjacent to said clamping-devices, said ejectors being provided with guiding-eyes and angular arms facing in opposite directions, spring-actuated latches hinged to the lower portions of the ejectors, reciprocating slide-pieces guided below the wire-clamping and ejecting devices and provided with straight front-ends and cam-portions adjacent to said ends for engaging said latches, and arms on the rear-ends of the slide-pieces connected with the sliding-sleeves for releasing the clamping devices and ejecting the wire bale-ties on the return-motion of the sliding-sleeves and slide-pieces.

In testimony, that I claim the foregoing as my invention, I have signed my name in presence of two subscribing witnesses.

BRUNO von BÜLTZINGSLÖWEN.

Witnesses:
PAUL GOEPEL,
JOHN MURTAGH.

---

Copies of this patent may be obtained for five cents each, by addressing the "Commissioner of Patents, Washington, D. C."